(12) United States Patent
Isaac

(10) Patent No.: US 7,134,707 B2
(45) Date of Patent: Nov. 14, 2006

(54) SELECTIVE LIGHT ATTENUATION SYSTEM

(75) Inventor: Emad S. Isaac, Woodridge, IL (US)

(73) Assignee: Motorola, Inc., Schaumburg, IL (US)

( * ) Notice: Subject to any disclaimer, the term of this patent is extended or adjusted under 35 U.S.C. 154(b) by 112 days.

(21) Appl. No.: 11/054,782

(22) Filed: Feb. 10, 2005

(65) Prior Publication Data

US 2006/0175859 A1  Aug. 10, 2006

(51) Int. Cl.
B60J 3/00 (2006.01)
(52) U.S. Cl. ..................... 296/97.6; 296/97.2
(58) Field of Classification Search ............... 296/97.6, 296/97.2, 97.4, 97.8, 97.9, 97.5; 362/492, 362/490, 144; 250/203.4, 201.1; 359/272
See application file for complete search history.

(56) References Cited

U.S. PATENT DOCUMENTS

| | | | | |
|---|---|---|---|---|
| 5,016,282 | A * | 5/1991 | Tomono et al. ............. 382/117 |
| 5,258,607 | A * | 11/1993 | Agostini et al. ............ 359/275 |
| 5,305,012 | A * | 4/1994 | Faris .......................... 359/604 |
| 5,671,035 | A | 9/1997 | Barnes | |
| 5,714,751 | A * | 2/1998 | Chen ....................... 250/203.4 |
| 5,969,754 | A * | 10/1999 | Zeman ....................... 348/136 |
| 6,056,424 | A * | 5/2000 | DiNunzio ................... 362/492 |
| 6,131,987 | A * | 10/2000 | Rossiter ..................... 296/97.2 |
| 6,244,703 | B1 | 6/2001 | Resnikoff et al. | |
| 6,393,133 | B1 | 5/2002 | Breed et al. | |
| 6,439,638 | B1 * | 8/2002 | Kawasaki et al. .......... 296/97.2 |
| 6,450,560 | B1 * | 9/2002 | Sturt et al. ................. 296/97.2 |
| 6,568,738 | B1 * | 5/2003 | Braun ........................ 296/97.6 |
| 6,811,201 | B1 * | 11/2004 | Naik .......................... 296/97.6 |
| 6,863,405 | B1 * | 3/2005 | Bechtel et al. ............. 359/604 |
| 6,993,255 | B1 * | 1/2006 | Braun et al. .................. 396/61 |
| 2003/0169213 | A1 | 9/2003 | Spero | |

FOREIGN PATENT DOCUMENTS

WO  WO 02/089714 A2  11/2002
WO  WO 03/005942 A1  1/2003

* cited by examiner

Primary Examiner—Kiran B. Patel
(74) Attorney, Agent, or Firm—Brian M. Mancini; Gary J. Cunningham

(57) ABSTRACT

A system for selectively attenuating light from a source of light, such as the sun, to a person's eyes in a vehicle. The system includes an electro-optical element (10) interposed between the source of light (16) and the person's eyes (14). The element (10) has pixels (18) that are operable to individually attenuate (38) light passing therethrough. A navigation system (28) determines a location and direction of travel of the vehicle. A memory (24) contains a general location for the person's eyes within the vehicle. Information (32) is made available for determining a position of the source of light. A controller (24) operates to determine those pixels of the elements that are calculated (38) to be between the person's eyes and the source of light, and to reduce the light transmittivity of those pixels (38) to attenuate the light from the source (16) to the person's eyes (14).

16 Claims, 3 Drawing Sheets

SELECTIVE LIGHT ATTENUATION SYSTEM

FIELD OF THE INVENTION

The present invention is generally directed to the field of light transmission systems, and specifically for light transmission systems for attenuating light through a vehicle's windows.

BACKGROUND OF THE DISCLOSURE

Vehicle operators are often exposed to intense light sources that can temporarily blind them while driving. Such light sources can include the sun during the day and oncoming headlights at night, for example. In addition, fixed sources of bright light, such as misdirected lighting at a factory and the like can also blind a driver. These intense light sources are a safety hazard by posing a distraction while driving. For example, the intense light may prevent drivers from seeing a possible hazard in their path. Moreover, an intense light will probably require drivers to adjust their sun visor to block the light source, which reduces their attention to their driving. Further, the sun visor itself will obstruct or lower a driver's visibility. In addition, there are many times when the sun visor, due to its mechanical limitations, is ineffective in blocking light when the light source is in areas not covered by the visor.

One solution is to provide tinting of the windshield and other glass of the vehicle. However, complete tinting of a windshield is illegal, and is also impractical at night. Moreover, the amount of tinting is limited by law, and therefore cannot provide sufficient protection from intense light sources such as the sun.

Another solution is to provide filtering, such as the use of a liquid crystal display (LCD) screen which can be used with cameras and sensors to detect the existence and position of a light source. This, along with the visual detection of a driver in the vehicle, is used to determine which portions of the LCD can be activated to block the driver's eyes from the light source. However, this solution has the disadvantage of being expensive, in that extra sensor and camera hardware is needed to not only detect the driver's (eye) position but also the light source position. Moreover, the system requires extensive computational complexity to track not only the driver position but also the light source position, and then to calculate their geometry in relation to the filter and the coordinates of the specific pixels of the filter to activate in order to block the light from the source to the driver.

Another solution is to provide spectacles that can block light. This solution has the same hardware problems of the previous case, and also requires even better tracking algorithms as the system must account for the movement of a driver's head. As a result, this system must track the light source, driver, and spectacles, making the real-time computational requirements even more severe. In addition, the wearing of these cumbersome spectacles would be a burden on the driver, making this solution impractical.

Another solution is to provide an automated mechanical visor system. However, not only does this system have the same problems as the sun visor described above, it also has the disadvantage of extreme hardware additions and modifications, not to mention the extensive control logic requirements. In addition, this system is prone to blockage of movement and mechanical breakdown.

Therefore, the need exists for a system and method to selective attenuate intense light sources that do not require additional sensors and cameras, and do not require the tracking of a driver's eyes or position. It would also be of benefit to provide such a system and method with a minimum amount of vehicle modifications, in order to reduce complexity, increase reliability and lower costs.

BRIEF DESCRIPTION OF THE DRAWINGS

The features of the present invention, which are believed to be novel, are set forth with particularity in the appended-claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF EMBODIMENTS OF THE INVENTION

The present invention describes a system and method to selective attenuate intense light sources that do not require additional sensors and cameras, and do not require the tracking of a driver's eyes or position. The present invention can be applied to all vehicles, including land, sea, and aircraft. The present invention requires the addition of an electro-optic element that is disposed on one or more of the glass surfaces of the vehicle, along with associated control and processing devices. As a result, the present invention provides a system and method with a minimum amount of vehicle modifications, which reduces complexity, increases reliability and lowers costs.

Figure 1:
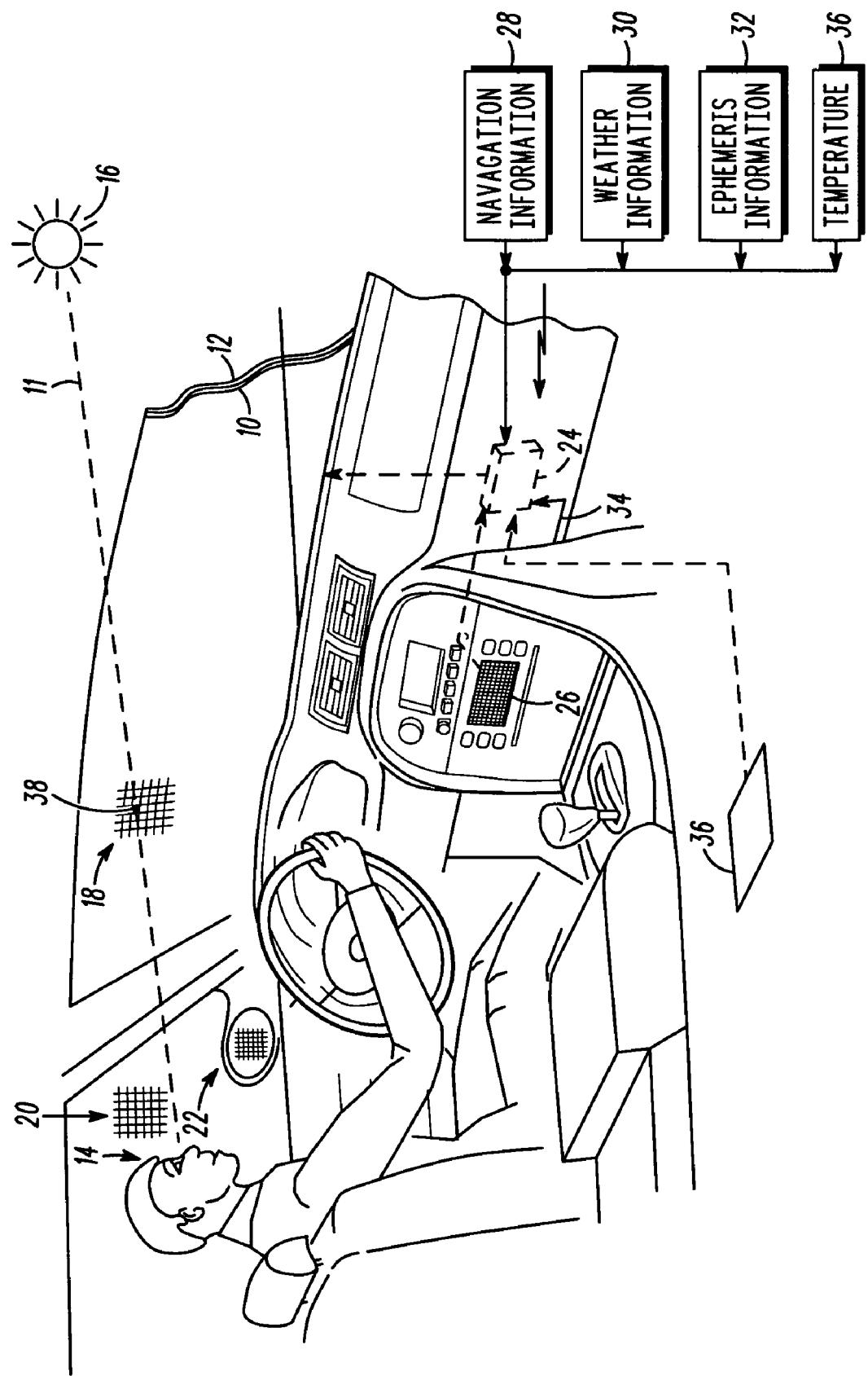
FIG. 1 is a view of a preferred embodiment of the present invention.

FIG. 1 demonstrates an application of the present invention in a vehicle, wherein the present invention selectively attenuates light 11 from a source of light 16 to a person's eyes 14 in a vehicle. A view from the driver's seat is shown looking out of the windshield. The source of light can be any intense light source such as the sun, oncoming headlights, fixed roadside lights, etc. An electro-optical element 10 is interposed between a source of light 16 and a person's eyes 14 to provide the selective attenuation. It is envisioned that a flexible element 10 can be provided that is adhesively affixed to the windshield 12 with electrical connections provided for data control by the controller 24 and for providing power (vehicle battery). The element can be a factory installed item, or an aftermarket installation. Preferably, the electro-optical element 10 is disposed on an inside of the windshield 12 of the vehicle. Alternatively, a rigid element can replace an existing sun visor, to provide a lower cost solution. In addition, the electro-optical element 10 can be further disposed on side windows 20 and rear windows (not shown) of the vehicle. Further, the electro-optical element 10 can be disposed on mirrors of the vehicle including the side view mirror 22 and rear view mirror (not shown). In fact, the electro-optical element 10 can be disposed on any transparent or reflective surface of the vehicle to provide complete coverage for the driver and passengers of the vehicle. The electro-optical element 10 can be composed of a liquid crystal display (LCD) element, a lead lanthanum zirconium titanate (PLZT) element, electrochromic element, or any other element that can attenuate the transmission of light by application of an electromagnetic field thereto, as are known in the art. It should be recognized that other selective light attenuating media can also be used equally well in the present invention. Preferably, the element configuration chosen per window should have a large contrast ratio since there are legal requirement for at least a certain minimum light transmittivity. However, different windows have different transmittivity requirements. Therefore, different element types can be combined in the present invention. It is assumed that the electro-optical element 10 in this example includes the necessary power and driver circuitry, as are known in the art, for proper control and operation of the element under command of a controller 24.

The electro-optical element includes individual regions or pixels 18 that are operable to selectively attenuate light 11 passing therethrough. The pixels can operate in either a fully ON (absorbent) state or fully OFF (transmissive) state. Preferably, the attenuation of the pixels can be modulated to provide various degrees of attenuation. In the example shown, only one pixel (see 18) is shown to attenuate light from the source 16. However, it should be recognized that several pixels can be used. For example, and group of pixels can be attenuated to attenuate a larger light source. The actual size and shape of the region of pixels to activate for attenuation can be automatically determined, manually selected, or a combination of both. In addition, the region of pixels can be controlled to provide a gradient of shading across the region wherein pixels near to the direct line of sight of the light 11 are attenuated more than pixels that are further away from the direct line of sight. In other words, the present invention can provide graduated shading, wherein the attenuation of individual pixels depends upon the nearness of the pixel to the direct line of sight. Of course, the amount of gradient and shading depends upon the size of each pixel wherein smaller pixels can provide more gradual shading.

A controller 24 in the vehicle inputs data from several sources, calculates geometries, and provides an output to control the element 10. The controller 24 includes a memory and calculates the coordinates of the pixels 18 (20, 22) of the element 10 that are between the person's eyes 14 and the source of light 16. The controller then addresses the element 10 to reduce the light transmittivity of the calculated pixel coordinates 18 to attenuate the light from the source 16 to the person's eyes 14. The controller calculates and addresses which pixels to attenuate using inputs from either or both of a manual user interface 26, such as touch pad (as shown), or through auxiliary information means. The user interface can also be a keyboard, microphone, or any other type of manual or automatic input device.

The auxiliary information means include various devices that provide information used by the controller to determine a geometric relationship between a position of the sun, a position of a driver's eyes, and the location of individual pixels of the element. These various devices can include one or more of navigational information 28, ephemeris information 32 for the sun, weather information 30, and a general position of a driver's or passenger's eyes within a three-dimensional space of the vehicle, which can be pre-stored in a memory of the controller 24.

Navigational information 28 can be obtained either through an onboard navigational system and/or through external navigational assistance that is wirelessly communicated to the vehicle, using techniques known in the art. The navigational information can include the time of day, a compass direction of travel the vehicle, and a location of the vehicle. In this way, the orientation of the vehicle on the globe can be determined for that particular time of day.

Ephemeris information 32 for the sun can be obtained either through an onboard database or through external ephemeris information that is wirelessly communicated to the vehicle, using techniques known in the art. Using a known time of day (referenced to GMT) the ephemeris information can determined a location of the sun in the sky for that particular time of day.

An internal memory (such as in controller 24) can be used to pre-store the geometric location of individual pixels of the element on the windshield, windows, and mirrors of the vehicle, as well as storing a general location of a driver's or passenger's eyes within the interior of the vehicle. For example, in those vehicles capable of storing a user's preferences, such as seat position, mirror position, and the like, the same system can be used to calibrate a location of a user's eyes relative to the element pixels. For example, a driver or passenger can be directed to use the user interface 26 to select (activate) the pixel in the person's view that lines up with a known external reference, such as a particular spot on the vehicle hood of fender. In this way, a general location of the user's eyes relative to the pixels can be calibrated.

Alternatively, the system can just assume a general location of a user's eyes. However, since a user interface is already present, it is preferred that users calibrate the system as described above. In this way, there are no additional cameras or sensors needed to locate and track a user's eyes. Although eye location is only generalized, it is believed that this is more than sufficient for proper operation of the present invention in that users will automatically move their head slightly to take advantage of any attenuated pixels that are blocking a light source. Therefore, real time tracking of a user's eyes is not needed.

Optionally, the present invention can provide an occupant detection system 36, as are known in the art, to only provide pixel attenuation for passengers that have pre-stored information and that are present invention vehicle, thereby avoid unnecessary shaded spots for the driver. If a passenger is in the vehicle, according to the occupant detection system, the controller can control multiple regions of pixels to attenuate the light from the source to any passenger's eyes. It is assumed that the system will always be active for the driver of a vehicle. For example, the system could only be active when the vehicle is moving or the transmission is in drive. However, it is envisioned that the system could also be active when the vehicle is not moving but with accessory power on or engine running, for those cases where a person may just be sitting in a car and waiting, such as at a traffic stop, etc.

In inclement weather it would not be necessary for the system to be operational (i.e. there is no sunlight to block). Therefore, the present invention utilizes weather information 30, from internal and/or external sources, to activate the system for blocking sunlight. (However, the system may still operate for other light sources as will be detailed below.) Weather related information 30 can be obtained by onboard means through the data bus 34 (e.g. controller area networking (CAN) vehicle bus), such as whether the headlights are on, the time of day (e.g. after sunset), whether the windshield wipers are on, or through an ambient light detector (such as one used to automatically activate headlights), externally through a wireless communication with a weather service. In this way, the system would only be active to block sunlight when it is estimated that the sun is not obscured (i.e. when there are no inclement weather indications).

Figure 2:
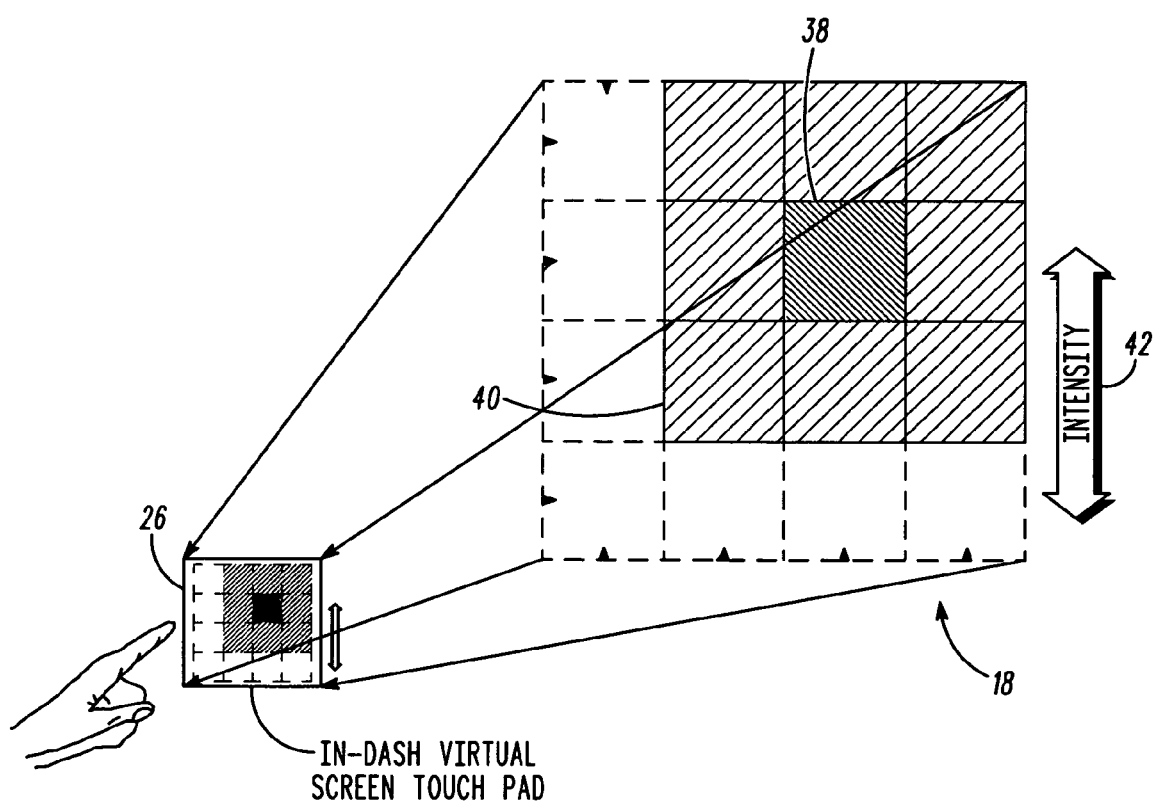
FIG. 2 is a view of the user interface mapping to pixels of FIG. 1.

The present invention can also be used to block intense light from sources other than the sun, such as oncoming headlights at night, fixed roadside lighting, or even defensive circumstances such as blocking laser light in aircraft or military vehicles. For these instances, a driver or passenger can use the user interface 26 to manually select pixels of the element to attenuate light. The user interface can be utilized from an existing user interface installed in the vehicle, or can be added as an aftermarket item that can be hardwired into the vehicle or provided with a wireless RF connection (e.g. Bluetooth™) to the controller. Referring to FIG. 2, the user interface 26 can be implemented as an in-dash virtual touchscreen pad. The touchscreen can be menu driven for example, to select a particular seating position in the vehicle, a particular user, or both. In addition, the user can select which portion of the element to attenuate (i.e. windshield, left/right front/rear side windows, rear window, and even individual mirrors). Once a relevant portion of the element is selected, a user can then be presented with a grid overlay of that particular region that maps the touchscreen locations 26 to the pixels 18 of the selected portion of the element, as shown in FIG. 2. The user can then use the touchscreen to select which pixels 38 to attenuate. For example, the user can place their finger on the touchscreen and observe which pixel of element is attenuated. The user can then slide their finger over the touchscreen to "move" the attenuate pixel to block the offending light source, similar to moving a mouse on a computer screen. Alternatively, the section can be selected by a text entry. The shape of the region of attenuated pixels can also be defined according to pre-defined templates and the time of day. For example, during the daytime an oval region of pixels can be used to attenuate the sun (oval to account for the parallax of the driver's two spaced-apart eyes relative to a substantial point light source). At night, a rectangular region can be selected to block two side-by-side headlights.

Afterwards, the user can modify the region around the selected pixel to provide a region of pixels with various attributes. For example, a user can leave their finger on the particular selected pixel on the touchscreen, wherein the attenuated (shaded) grouping of pixels expands 40 in a roughly circular or oval shape (or other suitable shape such as square or rectangular which can be a regular shape or irregular shape) until the user removes their finger from the touchscreen. Alternatively, a user can draw their finger around the selected pixel to define a customized region 40 or shape to be attenuated. Optionally, an intensity level (virtual slide switch 42) or other means can be provided on the touchscreen to increase or decrease the amount of attenuation of the pixels. A virtual slide switch can also be used to adjust the gradient of shading, size of shading region, shape of shading region, etc. For example, the gradient of shading can be such that the center pixel 38 has no (0%) transmittivity, and the surrounding pixels 40 can have some (e.g. 25%) transmittivity. Pixels further from the center can have more transmittivity to provide a smooth shading gradient. Alternatively, if the pixels are sufficiently small, transmittivity of each pixel can be either ON (100% transmittivity) or OFF (0% transmittivity) and the ratio of ON/OFF pixels within a region can be selected to provide the desired percentage of transmittivity.

If the light source is fixed in the distance, once the user has manually selected their desired attributes of the shaded pixels, the navigation system can be used (upon user confirmation) to keep shaded pixels between the user and the light source as the vehicle changes trajectory. For oncoming headlights it may not be necessary to use the navigation system as the light sources will generally be in the same pixel region, even though they are not fixed.

The manual selection of pixels as described above can also be used to modify those pixels that are automatically selected. For example, when the sun is low is the sky, there might be an additional glare or reflection off of the hood of the vehicle. Using the manual user interface techniques described above the user can manually expand or redraw the shade regions of pixels to cover not only the sun but also the region of reflected glare.

Referring back to FIG. 1, the present invention also has application to instances when the vehicle is not moving. For example, in the summer time the temperature inside of a parked vehicle can reach extreme levels. Inasmuch as the present invention provides means to block sunlight, these means can also be used to reduce the heat in the vehicle. In this case, an onboard temperature sensor and means to detect that the vehicle is not moving (such as detecting whether the transmission is in drive or the engine is running on the CAN bus), can be used to activate all the element pixels or, to save electrical energy, only those pixel elements that are facing the sun (using the previously determined navigational, ephemeris, and/or weather information). Specifically, when the temperature (inside or outside the vehicle) goes over a predetermined threshold, the light transmittivity of the pixels in the element are adjusted to assist in maintaining an interior temperature of the vehicle below the predetermined threshold. The same system can be used to provide a privacy setting when the vehicle is parked, wherein one or all windows of the vehicle can be blacked out.

In addition, since a light controlling element 10 with pixels 18 is disposed on a windshield 12 of the vehicle, said element can also be used to transmit information to a person in the vehicle, similar to a heads-up display. In particular the pixels of the element can be controlled by the controller 24 to provide text and graphics on the windshield (or other glass or mirrored surface). Such information can include vehicle status information from the vehicle bus 34, or text messaging information from a cellular radiotelephone system (not shown) coupled (either wirelessly or wired) to the vehicle controller.

Figure 3:
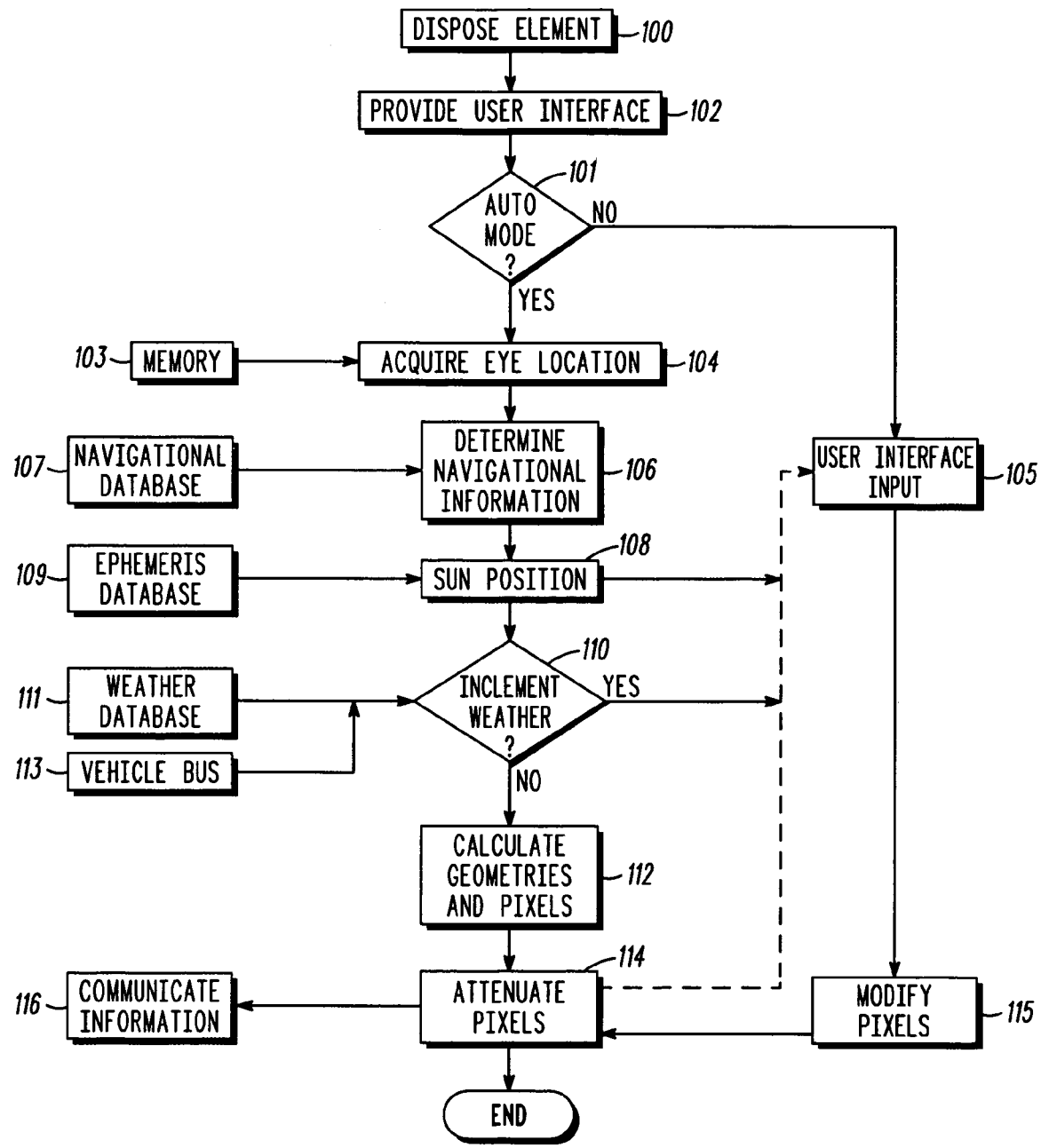
FIG. 3 is a flow chart of a method in accordance with the present invention.

FIG. 3 is a flowchart for a preferred embodiment of the present invention of FIG. 1 to selectively attenuating light from the sun to a person's eyes in a vehicle. Originally, the system calls for disposing 100 an electro-optical element on at least a windshield of the vehicle. The element has pixels that are operable to individually attenuate light passing therethrough. A controller can be calibrated with the location of each addressable pixel in the element, which can be stored in a memory 103, for example. The element can also be disposed on side and rear windows or any glass surface. The element can also be disposed on any of the mirror of the vehicle. Preferably, a user interface is also provided 102, if one does not already exist.

The method can operate in a manual mode where a user can manually select the pixels to attenuate and the amount of attenuation, or in automatic mode. The system can be set by user preference to be in either automatic or manual mode, or this can be user selected 101. In manual mode, in put is received from the user interface 105, wherein a user can select and modify 115 the pixels to be attenuated 114 as described previously. In automatic mode, further information is needed.

The method proceeds in automatic mode by acquiring 102 data including a general location of a driver's and/or passengers eyes. This data can be calibration data as previously described or a general estimate of a location of a user's eyes.

This information is stored in a memory 103, which can be included in the controller. The method then determines navigational information 106 for the vehicle. This can be obtained from a navigation database 107 that is either stored onboard the vehicle or is acquired through an external wireless based service. The navigation information can include at least the time of day, the location of the vehicle, and the direction of the vehicle.

The sun's position is then determined 108 using ephemeris information 109 that is either stored onboard the vehicle or is acquired through an external wireless based service. If it is night time (i.e. the sun is below the horizon), the method could end or proceed to manual mode 105 to allow the driver to manually compensate for oncoming headlights and the like.

It can also be estimated if the vehicle is experiencing inclement weather 1 10. Weather related information can be obtained from a weather database 111 through an external wireless based service or from onboard information through the vehicle data bus 1 13. For example, onboard weather related information can include whether the headlights are on, whether the windshield wipers are on, or through an ambient light detector (such as one used to automatically activate headlights). If there is an indication of inclement weather (i.e. the sun is obscured), the method could end or proceed to manual mode 105 to allow the driver to manually compensate for oncoming headlights and the like.

Given the driver and/or passenger eye locations from step 104, the vehicle orientation from step 106, the sun position from step 108, the method can calculate 112 those pixels of the element(s) that are between the person's eyes and the sun for a given time of day, ephemeris of the sun, and navigational information of the vehicle. The calculated pixels can then be controlled to attenuate 114 their light transmittivity to reduce the light from the light source to the person's eyes.

Preferably, a driver or passenger can choose to manually override or modify the automatic system by switching to a manual mode, using any known way to input commands to a system. In this way, a user can input new instructions 105 to override or modify 115 the pixels that are attenuated. Optionally, the method for selectively attenuating pixels can also be used to communicate 116 information to the person using the pixels of the element. Specifically, pixels can be select to display text and/or graphics by selective attenuation of particular pixels. In this way, such information as vehicle status or diagnostic information from the vehicle bus, or text messaging information from a cellular radiotelephone system, can be presented to a user similar to a heads-up display.

The present invention solves the problem of providing selective light attenuation with a minimum of hardware modification or cost. In it s basic form an electro-optical element is disposed on a windshield of the vehicle. This element can be controlled by an existing controller with additional software, such as is available with a Telematics unit for example. Although it is preferred that a user interface be included, such user interfaces can already exist in a luxury vehicle. Therefore, only the element hardware would be required.

The present invention gives a drive greater control and a wider range of shading, wherein driver distraction is potentially minimized. The cost of the system can be offset by the elimination of sun visor hardware and pre-tinted windshields. The removal of the sun visors can open up space in the vehicle for other systems, including the user interface of the present invention. The present invention can also be applied on a smaller scale by replacing the sun visor with a movable, semi-transparent electro-optical element, thereby reducing hardware and installation cost.

While the present invention has been particularly shown and described with reference to particular embodiments thereof, it will be understood by those skilled in the art that various changes may be made and equivalents substituted for elements thereof without departing from the broad scope of the invention. In addition, many modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

What is claimed is:

1. A system for selectively attenuating light from a source of light to a person's eyes in a vehicle, comprising:
   an electro-optical element interposed between the source of light and the person's eyes, the element having pixels that are operable to individually attenuate light passing therethrough;
   a navigation system operable to determine navigational information of the vehicle including a location and direction of travel of the vehicle;
   a memory that contains pre-stored general location for the person's eyes within the vehicle;
   information for determining a position of the source of light; and
   a controller coupled to the element, navigation system, and memory, the controller operable to determine those pixels of the element that are calculated to be between the person's eyes and the source of light, and to reduce the light transmittivity of those pixels to attenuate the light from the source to the person's eyes.

2. The system of claim 1, wherein the element is disposed on glass surfaces of the vehicle.

3. The system of claim 1, wherein the element is disposed on one or more of the group of a windshield of the vehicle, the windows of the vehicle, and the mirrors of the vehicle.

4. The system of claim 3, further comprising an occupant detection system coupled to the controller, wherein the controller controls multiple regions of pixels to attenuate the light from the source to any passenger's eyes.

5. The system of claim 1, wherein the source of light is the sun, and wherein the controller uses the location of the vehicle, the direction of the vehicle, the time of day and the information in the database to determine a position of the sun in the sky relative to a location of the person's eyes.

6. The system of claim 1, wherein the source of light is the sun, and further comprising means for determining the weather, wherein the system is only operable when it is estimated that the sun is not obscured.

7. The system of claim 1, further comprising a user interface coupled to the controller, wherein the user interface can be used by the person to manually select pixels of the element to attenuate light.

8. A system for selectively attenuating light from the sun to a person's eyes in a vehicle, comprising:
   an electro-optical element disposed on at least a windshield of the vehicle, the element having pixels that are operable to individually attenuate light passing therethrough;
   a navigation system operable to determine navigational information of the vehicle including a location and direction of travel of the vehicle;

a memory that contains a pre-stored general location for the person's eyes within the vehicle;

ephemeris information for the sun; and a controller coupled to the element, navigation system, and database, the controller operable to determine those pixels of the elements that are calculated to be between the person's eyes and the sun for the given time of day, ephemeris of the sun, and navigational information of the vehicle, those pixels are then selected for reducing their light transmittivity to attenuate the light from the sun to the person's eyes.

9. The system of claim 8, wherein the element is also disposed on the windows of the vehicle.

10. The system of claim 8, wherein the element is also disposed on the mirrors of the vehicle.

11. The system of claim 8, wherein the controller is operable to activate those pixels in a region that are on and near a direct line of sight between the person's eyes and the sun to attenuate light through the region using graduated shading, wherein the attenuation of individual pixels depends upon the nearness of the pixel to the direct line of sight.

12. The system of claim 11, further comprising a user interface coupled to the controller, wherein the controller selects the pixels for attenuation and the person selects the amount of attenuation.

13. The system of claim 8, further comprising a user interface coupled to the controller, wherein the user interface can be used by the person to manually select pixels to attenuate and to adjust the light transmittivity of the manually selected pixels.

14. The system of claim 8, further comprising means for determining the weather, wherein the system is only operable when it is estimated that the sun is not obscured.

15. The system of claim 8, further comprising a temperature monitoring system coupled to the controller, wherein the light transmittivity of the pixels in the element are adjusted to assist in maintaining an interior temperature of the vehicle below a predetermined threshold.

16. The system of claim 8, wherein the pixels of the element are also operable, under controller, to communicate information to the person.

* * * * *